Sept. 17, 1929.  C. FROESCH  1,728,236
ELECTRIC MOTOR DRIVE
Filed March 23, 1928
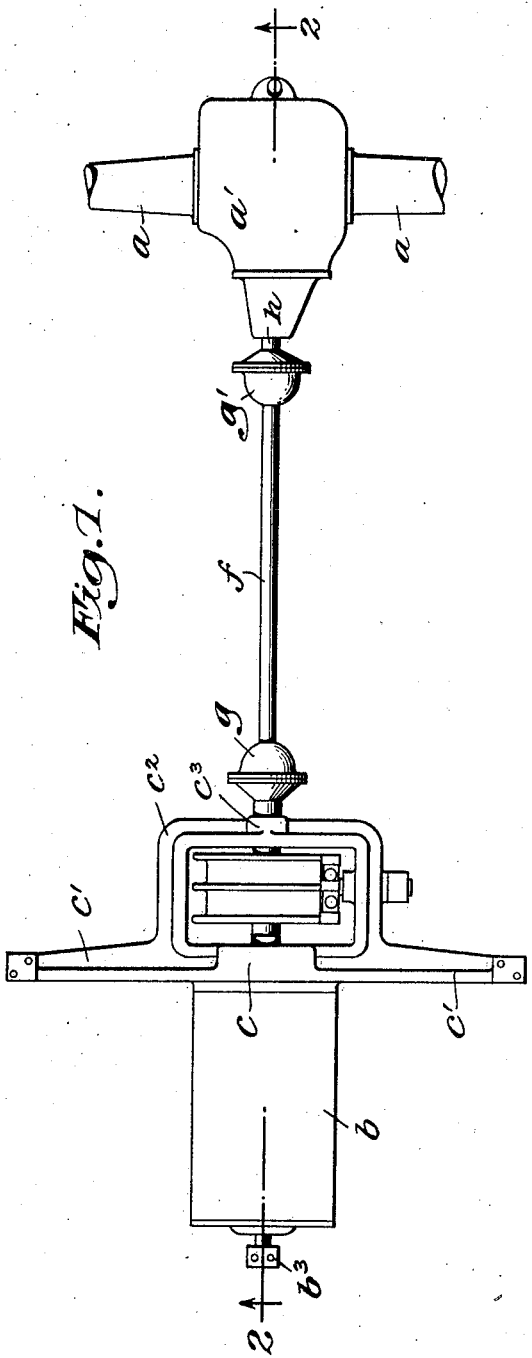
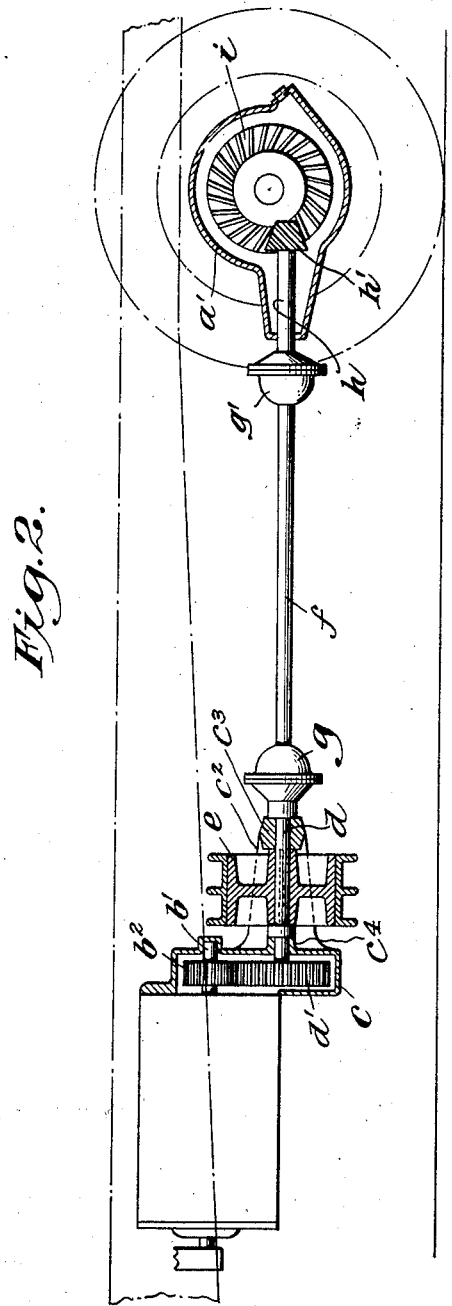

Patented Sept. 17, 1929.

1,728,236

UNITED STATES PATENT OFFICE

CHARLES FROESCH, OF TEANECK, NEW JERSEY, ASSIGNOR TO INTERNATIONAL MOTOR COMPANY, OF NEW YORK, N. Y., A CORPORATION OF DELAWARE

ELECTRIC-MOTOR DRIVE

Application filed March 23, 1928. Serial No. 264,203.

The present invention relates to drives for motor vehicles of the gasoline-electric type wherein the internal combustion engine drives a generator which supplies current to suitable driving motors located on the chassis. The power from these motors is applied, either directly to the rear axle, or through suitable drive shafts, and this invention relates particularly to a drive of the latter type wherein the rear axle differential receives power from a drive shaft through hypoid gearing, a suitable reduction being supplied for the motor end of the drive shaft in order that the motor speed may be sufficiently high.

In order to maintain the required driving ratio which is desirable in order that a small electric motor of relatively high speed may be used, the usual double reduction gearing, carried with the differential on the live axle, is replaced by a single reduction hypoid set of gears having a ratio of 4½ or 5 to 1, or any suitable ratio to keep the propeller shaft brake drum peripheral speed down to a safe limit. The second reduction which is necessary in order to permit the motor speed to be sufficiently high, is incorporated in the motor design itself, thus reducing the unsprung weight and permitting a light high speed motor to be used without interfering with the speed torque characteristics of the drive.

As a further feature of the invention, the propeller shaft brake is mounted as a unit with the motor and first reduction, the entire unit being mounted by a three point shock insulator suspension.

Further objects and advantages will appear as the description continues and reference will now be had to the accompanying drawings, wherein:

Figure 1 is a plan view showing the preferred form of the present invention.

Figure 2 is a view in section, taken on line 2—2 of Figure 1, and looking in the direction of the arrows.

Referring particularly to the drawings, $a$ indicates the rear axle housing provided with a differential housing $a'$. An electric motor $b$, having an armature shaft $b'$ and a driving gear $b^2$ is mounted in a casing having an end closure member $c$. This closure member is provided with transverse arms $c'$, the ends of which may be mounted in suitable cushioning members to provide, with the bracket $b^3$ on the motor, a three point suspension for the motor unit.

The closure member $c$ is formed with a hollow squared extension $c^2$, the opposite sides of which provide bearings for shaft section $d$. These bearings are shown at $c^3$ and $c^4$ in Figure 2. A brake drum $e$ is keyed to the shaft section $d$ and a gear $d'$ is mounted on the motor end of the shaft section $d$ and meshes with the driving gear $b^2$. Drive shaft $f$ is connected to shaft section $d$ through a universal joint $g$ and to a driven shaft section $h$ through a second universal joint $g'$. The ring gear $i$ is provided with hypoid gearing to mesh with the hypoid pinion $h'$ mounted on the shaft section $h$.

The unitary structure of the closure member $c$ provides great strength for the mounting of the brake drum and associated braking mechanism and greatly facilitates the assembling of the drive. By including the first reduction in the motor mounting, the unsprung weight carried by the rear axle is considerably lessened and the speed of the propeller shaft greatly reduced. By reason of the slow speed of the propeller shaft, the harshness of operation of the propeller shaft brake is reduced and the life of the brake lining correspondingly increased. With the construction shown, the propeller shaft brake speed will be even less than the speed of the propeller shaft of the general run of mechanical drives. In addition, the lower propeller shaft speed will eliminate the whip in the drive shaft which causes body drumming at high vehicle speeds.

The under-slung feature of the hypoid gears permits a decrease in the floor height and the provision of the propeller shaft brake, in addition to the usual wheel brakes, will cause the construction to comply with the laws requiring two independent sets of brakes. A shorter and lighter assembly is obtained by the construction described in view of the fact that the first reduction is combined with the propeller shaft brake and electric motor and the advantages flowing from this construction are quite material in the operation of the vehicle.

It will be apparent that the electric drive described herein may be used with a plurality of motors. Although various modifications can be made in the specific constructions used, the invention, which includes the structural combination set forth above is not to be limited, save as defined in the appended claims.

I claim as my invention:

1. In combination with a vehicle frame, an electric driving motor, an end closure therefor, mounting arms on the closure, reduction gears carried in the closure, a shaft section carried by the closure and driven by the gears, a brake drum carried by the shaft section, a propeller shaft, a final drive, and universal joints at either end of the propeller shaft.

2. In combination with a vehicle frame, a driving motor, an end closure therefor, mounting arms on the closure, reduction gears carried in the closure, a shaft section carried by the closure and driven by the gears, means to mount the shaft section adjacent its ends in the closure, a brake drum carried by the shaft section, brake operating mechanism carried by the closure, a propeller shaft, a final drive, and universal joints connecting the propeller shaft to the shaft section and the final drive.

3. In combination with a vehicle frame, a driving motor, a unitary end closure therefor, unitary mounting arms on the closure, reduction gears carried in the closure, a shaft section carried by the closure and driven by the gears, a brake drum carried by the shaft section, a propeller shaft, a final drive, and universal joints at either end of the propeller shaft.

This specification signed this 5th day of March, A. D. 1928.

CHARLES FROESCH.